US006477940B1

(12) United States Patent
Danckert et al.

(10) Patent No.: US 6,477,940 B1
(45) Date of Patent: Nov. 12, 2002

(54) HIGH-PRESSURE PISTON CYLINDER UNIT

(75) Inventors: Bernd Danckert, Meckenbeuren (DE); Rainer Von Bischopinck, Friedrichshafen (DE); Wolfgang Scheibe, Ludwigsburg-Poppenweiler (DE); Bernd Wagner, Ludwigsburg (DE)

(73) Assignees: MTU Moteren-und Turbinen-union Friedrichshafen GmbH (DE); L'Orange GmbH, Stuttgart (DE)

( * ) Notice: Subject to any disclaimer, the term of this patent is extended or adjusted under 35 U.S.C. 154(b) by 0 days.

(21) Appl. No.: 09/647,058

(22) PCT Filed: Mar. 24, 1999

(86) PCT No.: PCT/EP99/02010

§ 371 (c)(1), (2), (4) Date: Jan. 5, 2001

(87) PCT Pub. No.: WO99/49209

PCT Pub. Date: Sep. 30, 1999

(30) Foreign Application Priority Data

Mar. 26, 1998 (DE) ........................................ 198 13 454
May 7, 1998 (DE) ........................................ 198 20 264

(51) Int. Cl.[7] .................................................. F16J 1/00
(52) U.S. Cl. .................. 92/172; 239/533.11; 92/162 R

(58) Field of Search ............................... 92/172, 162 R; 239/533.11

(56) References Cited

U.S. PATENT DOCUMENTS

| | | | | | |
|---|---|---|---|---|---|
| 3,398,936 | A | * | 8/1968 | Delano | 239/533.11 |
| 3,425,635 | A | * | 2/1969 | Guertler | 239/533.11 |
| 3,722,801 | A | * | 3/1973 | Chapuis | 239/533.11 |
| 6,040,549 | A | * | 3/2000 | Kanaoka | 219/121.61 |

* cited by examiner

*Primary Examiner*—Edward K. Look
*Assistant Examiner*—Thomas E. Lazo
(74) *Attorney, Agent, or Firm*—Crowell & Moring LLP

(57) ABSTRACT

The invention relates to a high-pressure piston cylinder unit, especially an injection pump or an injection valve for an internal combustion engine, and to a method for producing one such high-pressure piston cylinder unit. The high-pressure piston cylinder unit has a piston which is guided inside a cylinder bore and which is coupled to an actuating element. The piston is subjected to a high pressure differential. According to the invention, fine grooves which run very close to one another are configured in at least one part of the guiding surface of the piston. The grooves ensure hydraulic pressure compensation on the periphery of the guiding surface, thus reducing wear, and prevent leakage in a longitudinal guiding direction.

42 Claims, 3 Drawing Sheets

HIGH-PRESSURE PISTON CYLINDER UNIT

Figure 1:
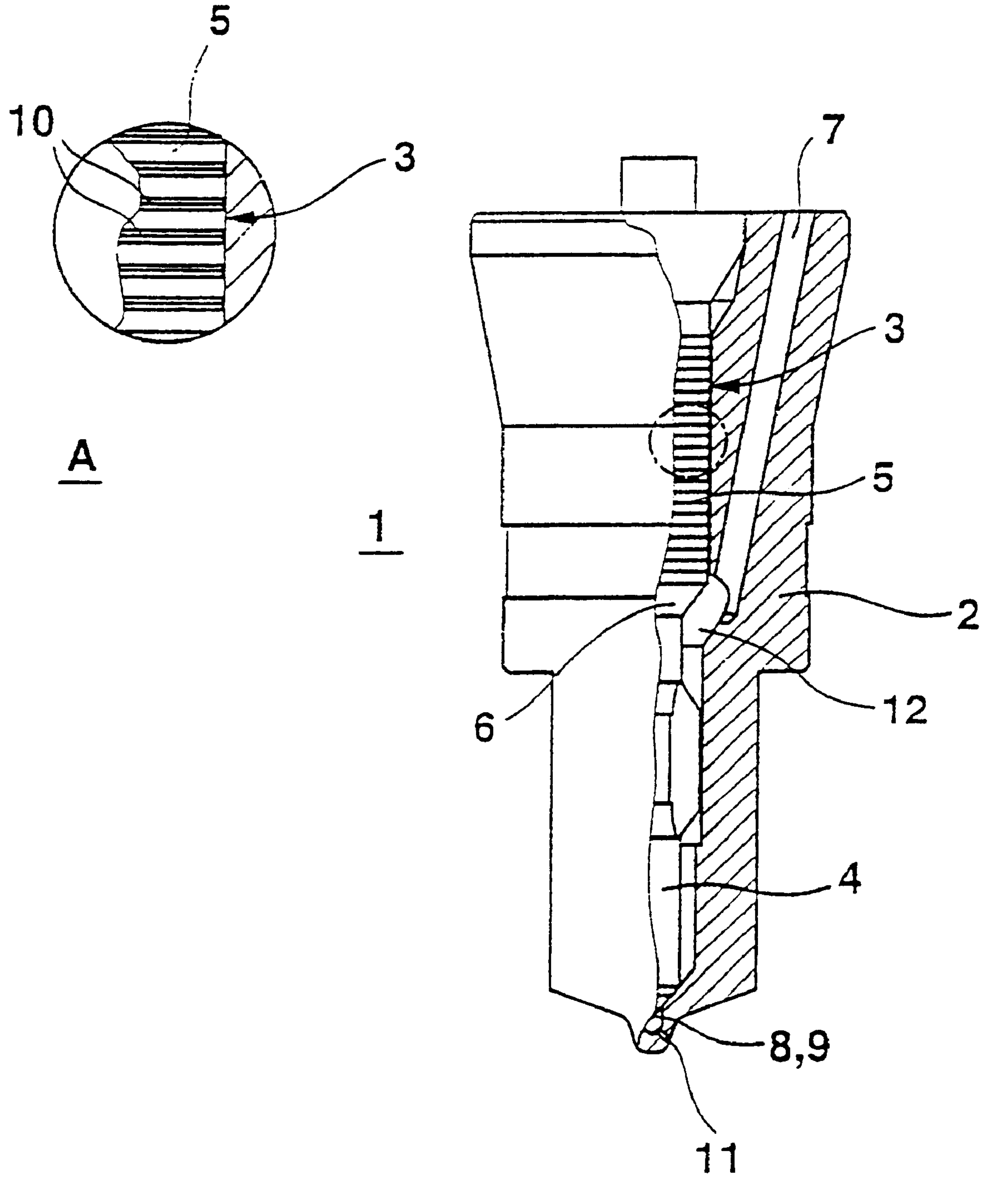

This invention relates to a high-pressure piston cylinder unit, especially an injection pump or an injection valve for an internal combustion engine.

In such a high-pressure piston cylinder unit, which is exposed to a great number of stroke cycles, as it is especially the case in an injection pump or an injection valve for an internal combustion engine, there is generally a piston present, which is carried in a cylinder bore, and which is exposed to a great pressure difference. The piston carried in the cylinder bore serves either to pump the fuel to be injected into the combustion chamber of the internal combustion engine, as in the case of an injection pump, or, in the case of an injection valve, it serves to open the injection valve when urged by the fuel that is to be injected, which is fed to it under high pressure, typically when the piston raises a needle valve coupled with it or made in one material piece with it from the valve seat of a needle valve and thus opens an injection cross section for the injection of the fuel into the combustion chamber of the internal combustion engine.

In a high-pressure piston cylinder unit of this kind it happens that, on account of ultimately unavoidable manufacturing tolerances, a deflection of the piston from its axis in the cylinder bore occurs, with the result that the pressure distribution is not uniform across the piston circumference on account of gap widths varying over the piston circumference, and a resultant radial force results therefrom which acts in the direction of the axial deviation. The unilateral urging of the piston in its guidance leads to wear on the surface of contact.

In the case of a common-rail fuel injection system, in which the fuel to be injected is held under high pressure in a reservoir and injected into the combustion chamber of the internal combustion engine by a fuel injector permanently fed with the fuel under high pressure, the danger of wear is especially high. In the case of permanently acting high pressures, the stress is made more severe by the fact that the radial forces resulting from the pressure forces act to the full extent during the entire stroke phase, unlike the case with a conventional injection system wherein the stroke takes place in any event partially in the pressure build-up phase, i.e., at pressures lower than the maximum injection pressure. Inasmuch as the piston serving for the operation of the injection valve of a common-rail fuel injector, which typically is coupled with the valve needle of the injection valve or is made of one piece of material with the latter, is permanently exposed to the applied high fuel pressure, when an off-axis deflection of the guidance of the nozzle needle to the nozzle needle seat, or of the piston in the cylinder bore, occurs, a permanent asymmetrical leakage occurs over the piston circumference. Furthermore, high radial forces intensifying the deflection, which are due to the high pressures, are present throughout the stroke, that is, especially right at the beginning of the stroke phase. These radial forces can lead to dulling or grinding and to great wear on the needle in the nozzle needle guide or on the piston in the cylinder bore.

DE 38 24 467 C2 discloses an injection valve for an internal combustion engine in which the valve needle is made bipartite with a hollow needle and a valve needle carried in an internal bore of the hollow needle. At its tip the hollow needle has a number of circumferential grooves which are spaced apart by approximately the same order of magnitude as the diameter of the valve needle and have a width and depth which correspond to about one-tenth of the valve needle diameter.

Furthermore, in MTZ 55 (1994) 9, p. 502, col. 3 and p. 511, col. 1, there is disclosed the use of titanium nitrite coatings for the pistons of fuel injection pumps for large diesel engines in order to prevent the “seizing” of the piston.

In EP 0 565 742 A1 methods are disclosed for the precision working of workpiece surfaces, especially the walls of bores in the cylinder of an internal combustion engine in which grooves arranged in a given pattern are produced in the surface by an irradiation treatment, especially by means of a laser, and are said to serve as a lubricant reservoir.

Lastly, in EP 0 419 999 B1 there is disclosed a method for the machining of surfaces subject to great friction in internal combustion engines, especially the inside surfaces of cylinders of piston engines, in which the surface is honed and finally subjected to a laser beam treatment, the laser treatment serving to vaporize protruding roughness tips or flaking in order to achieve a smoother surface.

The invention is addressed to the problem of devising a high-pressure piston cylinder unit, especially for an injection pump or an injection valve for an internal combustion engine in which there is less danger of wear due to axial deflection on a piston guided in a cylinder bore.

Furthermore, a method for the manufacture of such a high-pressure unit is to be provided by the invention.

By the invention, a high-pressure piston cylinder unit is created, especially an injection pump or an injection valve for an internal combustion engine, especially for a high stroke cycle rate, in which a piston guided in a cylinder bore is exposed on one end to a high pressure and thus a high pressure difference, while according to the invention fine grooves running parallel to one another at a small distance apart are formed in at least a portion of the guiding surface of the piston.

One advantage of the piston guiding surface made according to the invention is that a hydraulic pressure equalization is brought about on the circumference of the guide by the grooves, and thus any one-sided contact of the piston with the cylinder bore is prevented, or at least the pressing forces are reduced. As an additional advantage, the result is that the leakage flow is reduced after the piston is aligned centrally lengthwise of the piston guiding surface and thus the hydraulic efficiency of the unit is improved. A lessening of the leakage flow, however, is brought about also by the mere fact that the grooves running across the direction of the leakage flow act like a labyrinth seal. It is to be seen as a further advantage that the fluid present in the grooves wets the contact surfaces thereby achieving a lubricating effect.

The grooves formed in the guiding surface advantageously have a width b of between 5 and 100 $\mu$m, preferably between 10 and 40 $\mu$m.

The depth t of the grooves is advantageously between 3 and 50 $\mu$m, preferably between 10 and 30 $\mu$m.

The spacing a of the grooves amounts advantageously to between 0.05 and 1 mm, preferably between 0.1 and 0.5 mm, more preferably between 0.1 and 0.3 mm.

According to an advantageous embodiment, the width b of a groove is substantially the same as its depth t.

It is furthermore advantageous if the ratio of the depth t of the groove to the nominal diameter D of the guiding surface is between 1/200 and 1/1000.

According to an embodiment of the invention the grooves run circumferentially on the guiding surface.

According to a further development hereof the grooves can be made with a spacing a that varies lengthwise of the guiding surface.

According to another embodiment of the invention, the grooves run lengthwise of the guiding surface.

According to another embodiment of the invention, the grooves run at an angle to the length of the guiding surface.

According to a further development hereof the grooves can have a varying pitch lengthwise of the guiding surface.

According to another embodiment of the invention which is very advantageous from the manufacturing point of view the grooves are formed by a helical line.

This can be further developed if the helical line is multiple.

The helical line can have a pitch that varies lengthwise of the guiding surface.

According to still another embodiment of the invention, the grooves are made to cross at various angles to the length of the guiding surface.

This can be further developed by providing the grooves with a pitch varying lengthwise along the guiding surface.

In the above-mentioned embodiments it may be advantageous to provide the spacing a of the grooves lengthwise of the guiding surface such that it corresponds substantially to the working stroke of the piston in the cylinder bore.

In another embodiment of the invention, a plurality of the above-named patterns can be combined in forming the grooves.

According to an embodiment of the invention, the grooves are formed in an area of the guiding surface adjoining the high-pressure side of the piston.

As an alternative thereof the grooves can be formed over the entire area of the guiding surface.

According to an embodiment of the invention the grooves are formed in the circumferential surface of the piston that serves as a guiding surface.

Alternatively, or in addition thereto, the grooves can be provided in the cylinder bore serving as guiding surface.

The invention is especially valuable in a high-pressure piston cylinder unit which is the component of a fuel injector of a common-rail injection system in which the piston serves to operate the injection valve of the fuel injector, and in which the pressure difference is permanently applied to the piston. In such a component permanently exposed to the fuel pressure a constant axial deflection can occur, i.e., from the beginning of the movement of the piston in the cylinder bore, and therefore a substantial reduction of wear can be achieved by the invention with special advantage in this case.

In such a high-pressure unit serving as a component of a common-rail injection system, the piston is advantageously made in one piece with the nozzle needle of the injection valve, while the piston has a shoulder to which the fuel pressure of the common-rail injection system is permanently applied.

Advantageously according to the invention the grooves are formed on the circumferential piston surface serving as guiding surface where it adjoins the shoulder to which the fuel pressure is applied.

The method of the invention for the manufacture of a high-pressure unit of the invention provides that the grooves are produced by machining, for example by precision turning.

An alternative method which is especially advantageous is to produce the grooves by beam machining.

Such beam machining is advantageously performed especially by laser engraving.

An advantageous embodiment of the method of the invention provides such that, after the grooves have been produced, a lapping or fine grinding of the guiding surface is performed. But a precision working of the guiding surface can precede the production of the grooves.

Figure 2:
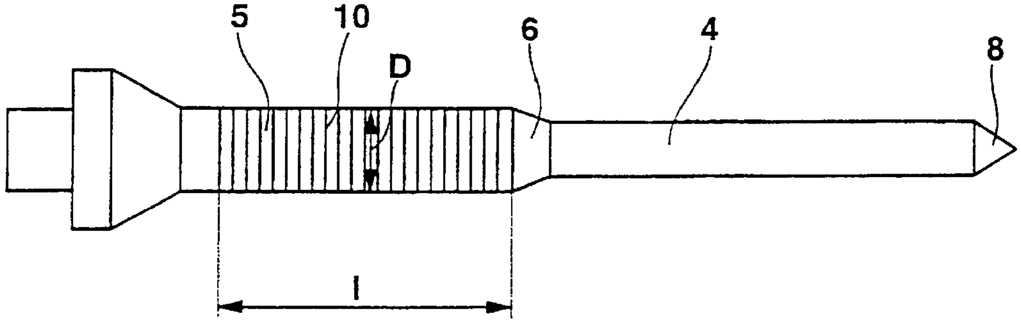
Figure 3:
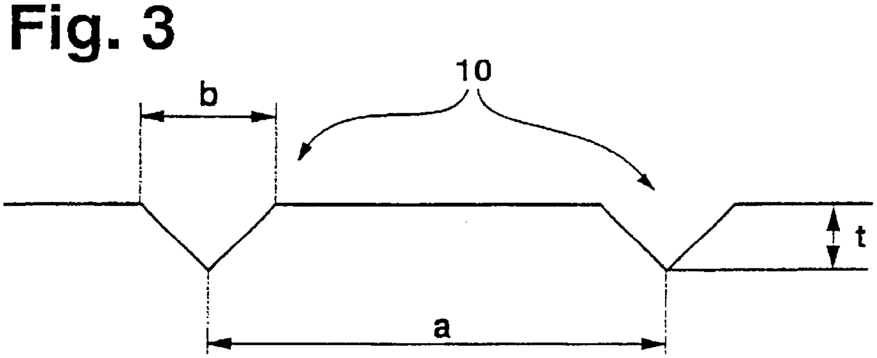
Figure 4:
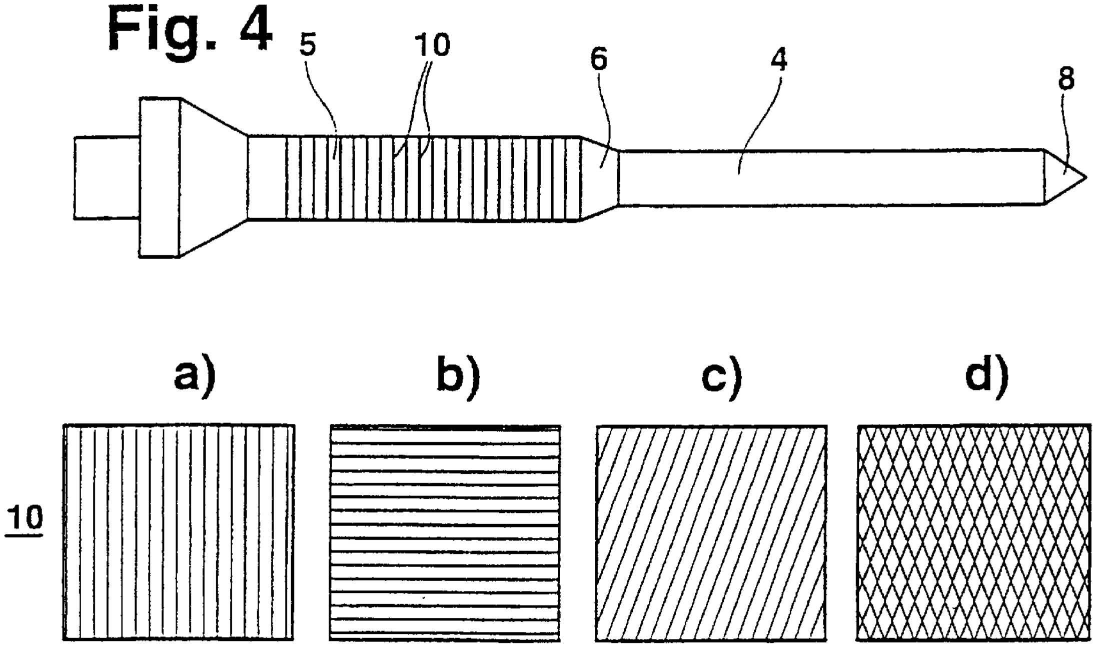
Figure 5:
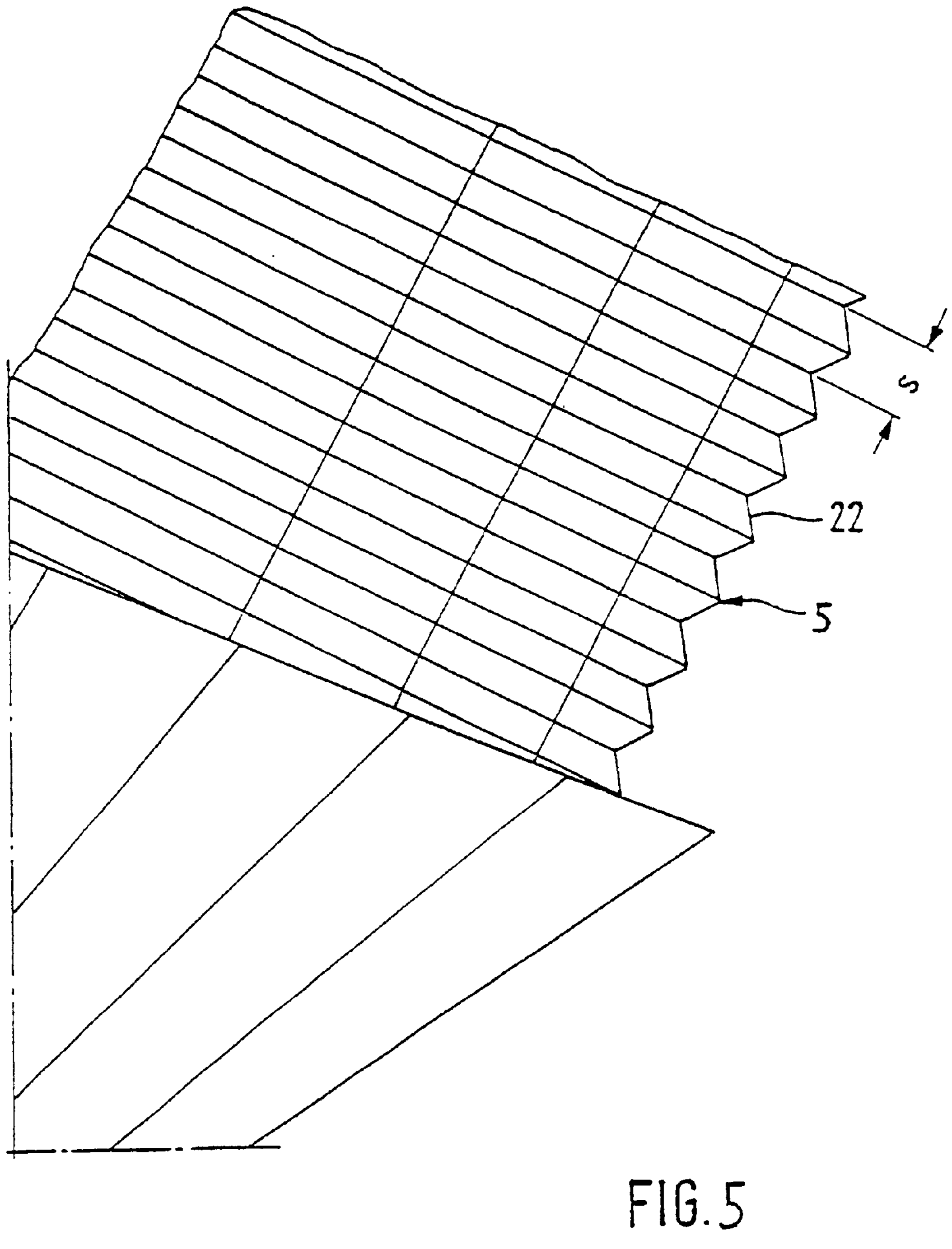

Embodiments of the invention will be explained hereinafter in connection with the drawing, wherein:

FIG. 1 is a partially cut-away side view of the injection valve of a fuel injector of a common-rail injection system which is configured according to an embodiment of the invention, wherein the section A enlarges the fine grooves provided in the guiding surface of a piston of the injection valve;

FIG. 2 an enlarged view of the nozzle needle of the injection valve of the fuel injector shown in FIG. 1;

FIG. 3 a greatly enlarged cross section through the fine grooves formed on the guiding surface of the piston of the nozzle needle shown in FIG. 2, FIG. 4 a view corresponding to FIG. 2 of the nozzle needle of the injection valve with four embodiments a) to d) of the arrangement of the grooves on the circumferential surface of the nozzle needle piston serving as guiding surface, and FIG. 5 a greatly enlarged view of the piston with grooves in the form of helical threads.

FIG. 1 shows a view, partially in cross section, of the injection nozzle of a fuel injector for a common-rail fuel injection system. The injection nozzle marked with reference number 1 has a needle housing 2 in which a cylinder bore 3 is provided. In this cylinder bore 3 a piston 5 is guided, which is made of one piece of material with the nozzle needle 4. The nozzle needle 4 has a tip 8 which cooperates with a valve seat 9. In the area of the valve seat 9 an injection cross-section 11 is provided in the form of injection orifices. At the transition from the piston 5 to the nozzle needle 4 a shoulder 6 is formed which is in the area of an annular chamber 12 formed in the needle housing, into which a fuel passage 7 leads. The fuel passage 7 leads to a high-pressure accumulator of the common rail system, in which the fuel to be injected is held under high pressure. To control the injection nozzle 1, the fuel injector has an operating means of an electromechanical or hydraulic kind not shown in FIG. 1, but of a kind that is well known, by which the piston 5 is released in the sense of an upward movement, so that the fuel pressure acting in the annular chamber 12 on the shoulder 6 of the piston produces a lifting of the nozzle needle 4 and hence of the needle tip 8 from the valve seat 9 and thus a release of the injection cross section 11.

As it can be seen in the enlarged section marked A, fine grooves 10 running at a short distance apart are formed in the circumferential surface of piston 5. These grooves 10 produce on the one hand a hydraulic pressure equalization over the circumference of the piston 5 in the guide formed by the cylinder bore 3 and thus prevent a one-sided contact of the piston 5 on account of the fuel entering from the annular chamber 12 under high pressure into the gap between the circumferential surface of the piston 5 and the cylinder bore 3 in case of an axial deflection of the nozzle needle guide. At the same time any unsymmetrical and thus intensified leakage flowing lengthwise of the guide between the circumferential surface of the piston 5 and the cylinder bore 3 is reduced and thus the hydraulic efficiency of the fuel. injector is improved.

In FIG. 2 the nozzle needle 4 made in one piece with the piston 5 is shown in an enlargement. The piston 5 has a nominal diameter D which in the embodiment represented is 6.8 millimeters. Beginning from the shoulder 6, and thus from the side of piston 5 that is impacted by the fuel contained under high pressure in annular chamber 12, the grooves 10 running around the external surface of piston 5 are formed on a length l. In the embodiment represented, this length l on which the grooves 10 are provided amounts to about 22 mm.

FIG. 3 is a greatly enlarged cross section through the surface of the piston 5 showing two grooves 10. The cross section of grooves 10 is of a substantially triangular shape in the embodiment shown. The width b of a groove amounts to 5 to 100 μm, for example, preferably between 10 and 40 μm. The groove depth can be 3 to 50 μm, preferably between 10 and 30 μm. In the embodiment represented the depth t is 15 pm. The distance a between two grooves can be between 0.05 and 1 mm, preferably between 0.1 to 0.5 mm, preferably between 0.1 to 0.3 mm. In the embodiment shown the distance a is 0.2 mm.

The ratio of the depth t of groove 10 to the nominal diameter of the guiding surface or of the piston 5 amounts advantageously according to the invention to between 1/200 and 1/1000. In the embodiment shown, the said ratio is approximately 1/450, which has proven especially advantageous.

The cross section of the grooves 10 can have other shapes than a triangular shape, for example a half-round shape.

FIG. 4 shows again a representation corresponding to FIG. 2 and examples a) to d) of the pattern of the circumferential surface of piston 5.

According to the example in FIG. 4*a*) the grooves 10 are formed circumferentially around the piston 5, as represented in the side view and also in FIG. 2. In the embodiment the grooves are formed lengthwise with an equal distance a; alternatively, the grooves can also be formed with a spacing a varying lengthwise of the guiding surface.

In the embodiment in FIG. b) the grooves 10 are running lengthwise along the guiding surface.

In the embodiment in FIG. 4*c*) the grooves 10 run at an angle to the length of the guiding surface. In the embodiment shown, the grooves 10 have all an equal pitch. Alternatively thereto, the grooves 10 can also be provided with a pitch varying lengthwise of the guiding surface.

As a borderline case of the circumferential arrangement of grooves 10 as in FIG. 4*a*) and the arrangement of the grooves at an angle to the length as in FIG. 4*c*), the grooves 10 can be in the form of a helical line. A section of the guiding surface with grooves in the form of helical threads 22 is shown in FIG. 5. The guiding surface is a cylindrical piston surface which is divided by the threads of the screw thread 22. The pitch of the screw thread 22 is given as s. The screw thread or helical line can be single or multiple. The helical line can have a constant pitch lengthwise of the guiding surface, or as an alternative a pitch varying lengthwise of the guiding surface. The embodiment of the grooves in a helical line is especially advantageous as regards manufacture.

According to FIG. 4*d*) the grooves 10 can be made crossing one another lengthwise at various angles, the angles being opposite, but equal in number, or also different in number. While in the case of the embodiment shown the pitch of the grooves 10 is equal lengthwise of the guiding surface, the grooves 10 can alternatively also be formed with a pitch varying lengthwise of the guiding surface.

The patterns according to FIGS. 4*a*) to 4*d*) are basic patterns; different patterns, however, are also possible. Also, several patterns of the kind described in reference to FIGS. 4*a*) to 4*d*) can be combined.

According to a special embodiment of the invention the spacing a of the grooves 10 lengthwise of the guiding surface is selected such that it corresponds substantially to the working stroke of piston 5 in the cylinder bore 3. This has the advantageous effect that the remaining guiding surface on the circumference of the piston 5 moves constantly on wetted surfaces of the guide between the grooves 10 and thus any dry running of the guide becomes more or less impossible. In the case of a single thread, the distance a between the grooves 10 then corresponds to the thread pitch.

In the embodiments represented by FIGS. 1 to 4, the grooves 10 in the circumferential surface of the piston 5 are configured in their function as a guiding surface. Alternatively, or in some cases additionally thereto, the grooves 10 also be formed as a guiding surface in the cylinder bore 3.

In the application shown in FIG. 1 of an injection valve for a common-rail fuel injector, the fuel pressure reserved in the reservoir is permanently applied through the fuel passage 7 and the annular chamber 12 to the shoulder 6 of piston 5, so that the piston 5 is permanently exposed to a unilateral pressure difference. In this case the advantage of the hydraulic pressure equilibrium and the reduction of the leakage flow comes especially to the fore. However, also in the case of other high-pressure piston cylinder units in which a piston is subjected at one end to high pressure differences, as is especially the case in other injection valves and in injection pumps for internal combustion engines, the invention leads to a corresponding advantage.

The grooves 10 in the guiding surface of the piston, i.e., in the circumferential surface of the piston 5, or in the surface of the cylinder bore 3, can be produced by machining, for example by turning, precision turning, grinding or milling. Alternatively, the grooves, especially on the surface of the piston 5 can be produced by beam machining, the method of laser engraving being especially advantageous. The production of the groove 10 is performed by the precision machining (grinding) of the guiding surface. After the grooves 10 are produced, a lapping or fine polishing of the guiding surface is also performed in order to obtain the final finish of the guiding surface. Precision machining of the guiding surface before producing the grooves can also be omitted if sufficient dimensional accuracy can be assured by appropriate manufacturing methods.

What is claimed is:

1. A high-pressure piston cylinder unit comprising a piston guided in a cylinder bore and coupled with an operating element which is exposed to a great pressure difference, and fine grooves formed in at least a portion of a guiding surface of the piston, wherein said fine grooves are closely spaced apart, have a width b of between 5 and 100 μm, and have a spacing a of between 0.05 and 1 mm.

2. A high-pressure unit according to claim 1, wherein the grooves have a depth t of between 3 and 50 μm.

3. A high-pressure unit according to claim 2, wherein the grooves have a depth t of between 10 and 30 μm.

4. A high-pressure unit according to claim 1, wherein the grooves have a width b and a depth t and the width b of a groove is substantially the same as its depth t.

5. A high-pressure unit according to claim 1, wherein the grooves have a depth t and the guiding surface has a nominal diameter D and the ratio of the depth t of the groove to the nominal diameter D of the guiding surface is between 1/200 and 1/1000.

6. A high-pressure unit according to claim 1, wherein the grooves run in the circumferential direction of the guiding surface.

7. A high-pressure unit according to claim 6, wherein the grooves are formed with a spacing a varying lengthwise of the guiding surface.

8. A high-pressure unit according to claim 1, wherein the grooves run lengthwise on the guiding surface.

9. A high-pressure unit according to claim 1, wherein the grooves run at an angle to the length of the guiding surface.

10. A high-pressure unit according to claim 9, wherein the grooves have a pitch varying lengthwise of the guiding surface.

11. A high-pressure unit according to claim 1, wherein the grooves are formed by one of the left-hand helical line and a right-hand helical line.

12. A high-pressure unit according to claim 11, comprising multiple helical lines.

13. A high-pressure unit according to claim 12, wherein the helical line has a pitch varying lengthwise of the guiding surface.

14. A high-pressure unit according to claim 12 wherein the helical line has a pitch varying lengthwise of the guiding surface.

15. A high-pressure unit according to claim 1 wherein the grooves:

(A) run in the circumferential direction of the guiding surface, (B) run lengthwise on the guiding surface, or (C) run at an angle to the length of the guiding surface, (D) have a pitch varying lengthwise of the guiding surface, (E) are formed by a left-hand helical line, (F) right-hand helical line, (G) cross one another at various angles to the length of the guiding surface, (H) run with varying pitch lengthwise of the guiding surface, or (I) a combination thereof.

16. A high-pressure unit according to claim 1, wherein the grooves are formed in an area of the guiding surface adjoining a high-pressure end of the piston.

17. A high-pressure unit according to claim 1, wherein the grooves are formed over the entire area of the guiding surface.

18. A high-pressure unit according to claim 1, wherein the grooves are formed as a guiding surface in the surface of the piston.

19. A high-pressure unit according to claim 1, wherein the grooves are formed as a guiding surface in the cylinder bore.

20. A high-pressure unit according to claim 1, wherein the high-pressure piston cylinder unit is a component of a fuel injector of a common-rail injection system in which the piston serves for the operation of the injection valve of the fuel injector, and wherein the pressure difference is applied permanently to the piston.

21. A high-pressure unit according to claim 20, wherein the piston is made in one piece of material with the nozzle needle of the injection valve, the piston having a shoulder which is permanently subjected to the fuel pressure of the common-rail injection system.

22. A high-pressure unit according to claim 21, wherein the grooves are formed on the circumferential surface of the piston serving as a guiding surface and adjoining the shoulder subjected to the fuel pressure.

23. A method for the manufacture of a high-pressure unit according to claim 1, comprising producing the grooves by machining.

24. A method for the manufacture of a high-pressure unit according to claim 23, wherein the machining is selected from the group consisting of turning, precision turning, grinding and milling.

25. A method for the manufacture of a high-pressure unit according to claim 1 comprising producing the grooves by beam machining.

26. A method according to claim 25, comprising producing the grooves by laser engraving.

27. A method according to claim 25, comprising lapping or precision grinding the guiding surface after producing the grooves.

28. A method according to claim 27, comprising precision machining the guiding surface before producing the grooves.

29. A method for the manufacture of a high-pressure unit according to claim 25 wherein beam machining is laser beam machining or electron beam machining.

30. A high-pressure piston cylinder unit according to claim 1, wherein said high-pressure piston cylinder unit is an injection pump or injection valve for an internal combustion engine.

31. A high-pressure unit according to claim 1, wherein the grooves have a width b of between 10 and 40 $\mu$m.

32. A high-pressure unit according to claim 1, wherein the grooves have a spacing a of between 0.1 and 0.5 mm.

33. A high-pressure unit according to claim 32, wherein the grooves have a spacing a of between 0.1 and 0.3 mm.

34. A high-pressure unit according to any one of claims 6 to 14 or 32, wherein the grooves have a spacing a and the spacing a of the grooves lengthwise of the guide surface is substantially the same as the working stroke of the piston in the cylinder bore.

35. A high-pressure piston cylinder unit comprising a piston guided in a cylinder bore and coupled with an operating element which is exposed to a great pressure difference, and fine grooves formed in at least a portion of a guiding surface of the piston, said fine grooves being closely spaced apart, wherein grooves cross one another at various angles to the length of the guiding surface.

36. A high-pressure unit according to claim 35, wherein the grooves run with varying pitch lengthwise of the guiding surface.

37. A high-pressure unit according to claim 35 or 36, wherein the grooves have a spacing a and the spacing a of the grooves lengthwise of the guiding surface is substantially the same as the working stroke of the piston in the cylinder bore.

38. A method for the manufacture of a high-pressure piston cylinder unit comprising a piston guided in a cylinder bore and coupled with an operating element which is exposed to a great pressure difference, and fine grooves formed in at least a portion of a guiding surface of the piston, said fine grooves being closely spaced apart, said method comprising producing the grooves by machining and lapping or precision grinding the guiding surface after producing the grooves.

39. A method for the manufacture of a high-pressure piston cylinder unit comprising a piston guided in a cylinder bore and coupled with an operating element which is exposed to a great pressure difference, and fine grooves formed in at least a portion of a guiding surface of the piston, said fine grooves being closely spaced apart, said method comprising producing the grooves by laser engraving and lapping or precision grinding the guiding surface after producing the grooves.

40. A method for the manufacture of a high-pressure piston cylinder unit comprising a piston guided in a cylinder bore and coupled with an operating element which is exposed to a great pressure difference, and fine grooves formed in at least a portion of a guiding surface of the piston, said fine grooves being closely spaced apart and have a spacing a of between 0.1 and 0.3 mm, said method comprising lapping or precision grinding the guiding surface after producing the grooves.

41. A method for the manufacture of a high-pressure piston cylinder unit comprising a piston guided in a cylinder bore and coupled with an operating element which is exposed to a great pressure difference, and fine grooves formed in at least a portion of a guiding surface of the piston, said fine grooves being closely spaced apart and formed by multiple helical lines which are one of a left-hand helical line and a right-hand helical line, wherein the helical line has a pitch varying lengthwise of the guiding surface, said method comprising lapping or precision grinding the guiding surface after producing the grooves.

42. A method according to any one of claims 38-41, comprising precision machining the guiding surface before producing the grooves.

* * * * *